United States Patent
Rush et al.

(10) Patent No.: US 7,631,294 B2
(45) Date of Patent: Dec. 8, 2009

(54) NOTIFICATION SYSTEM FOR SOURCE CODE DISCOVERY

(75) Inventors: Darren Rush, Santa Monica, CA (US); Ankur Bulsara, Los Angeles, CA (US)

(73) Assignee: Black Duck Software, Inc., Waltham, MA (US)

( * ) Notice: Subject to any disclaimer, the term of this patent is extended or adjusted under 35 U.S.C. 154(b) by 0 days.

(21) Appl. No.: 11/561,375

(22) Filed: Nov. 17, 2006

(65) Prior Publication Data

US 2008/0072210 A1     Mar. 20, 2008

Related U.S. Application Data

(60) Provisional application No. 60/845,865, filed on Sep. 19, 2006.

(51) Int. Cl.
*G06F 9/44* (2006.01)

(52) U.S. Cl. ...................................... 717/111

(58) Field of Classification Search ......... 717/106–109, 717/124, 127, 163, 4, 8, 104, 111; 707/1, 707/103 R; 715/816
See application file for complete search history.

(56) References Cited

U.S. PATENT DOCUMENTS

| | | | |
|---|---|---|---|
| 4,558,413 A | 12/1985 | Schmidt et al. | |
| 5,937,406 A | 8/1999 | Balabine et al. | |
| 6,240,412 B1 | 5/2001 | Dyko et al. | |
| 6,253,199 B1 | 6/2001 | Wakio et al. | |
| 6,305,008 B1 * | 10/2001 | Vaidyanathan et al. | 717/111 |
| 6,341,288 B1 * | 1/2002 | Yach et al. | 707/103 R |
| 6,367,068 B1 * | 4/2002 | Vaidyanathan et al. | 717/143 |
| 7,171,646 B2 * | 1/2007 | Charisius et al. | 717/100 |
| 2002/0059185 A1 | 5/2002 | Woo | |
| 2002/0178434 A1 * | 11/2002 | Fox et al. | 717/106 |
| 2003/0033379 A1 | 2/2003 | Civanlar et al. | |
| 2003/0120711 A1 * | 6/2003 | Katz | 709/106 |
| 2004/0031015 A1 * | 2/2004 | Ben-Romdhane et al. | 717/107 |
| 2005/0091612 A1 * | 4/2005 | Stabb et al. | 715/816 |
| 2006/0101443 A1 * | 5/2006 | Nasr | 717/163 |
| 2007/0006152 A1 * | 1/2007 | Ahmed et al. | 717/122 |

* cited by examiner

*Primary Examiner*—Tuan Anh Vu
(74) *Attorney, Agent, or Firm*—Perkins Coie LLP

(57) ABSTRACT

In various embodiments, a system, method and apparatus for notification of source code discovery is provided. In an embodiment, a method is provided. The method includes detecting a change in source code. The method further includes extracting the change in source code. The method also includes constructing a search criteria based on the change in source code. Moreover, the method includes receiving the search results responsive to the search criteria. Also, the method includes presenting information related to the search results.

39 Claims, 14 Drawing Sheets

Fig. 2

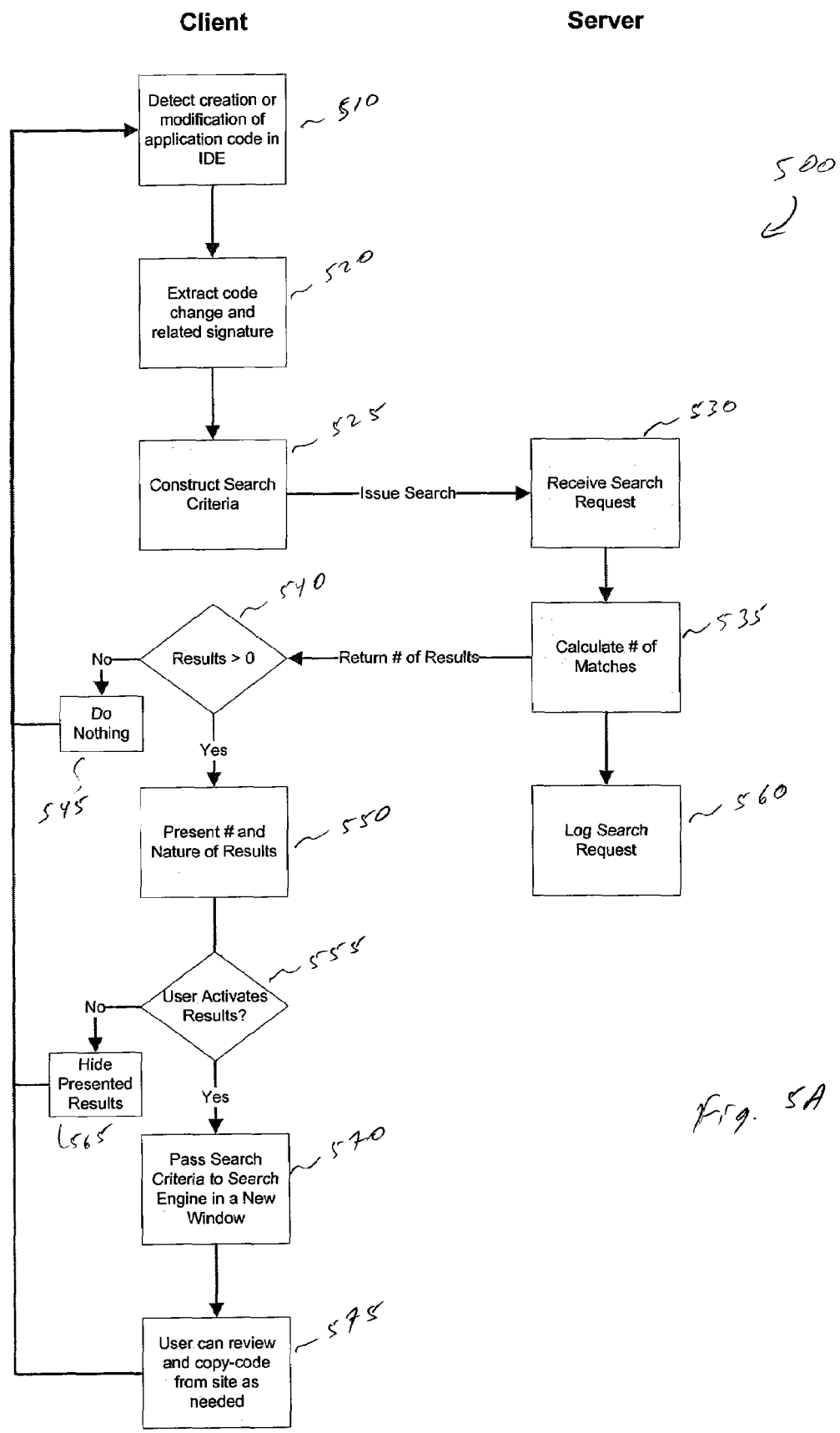

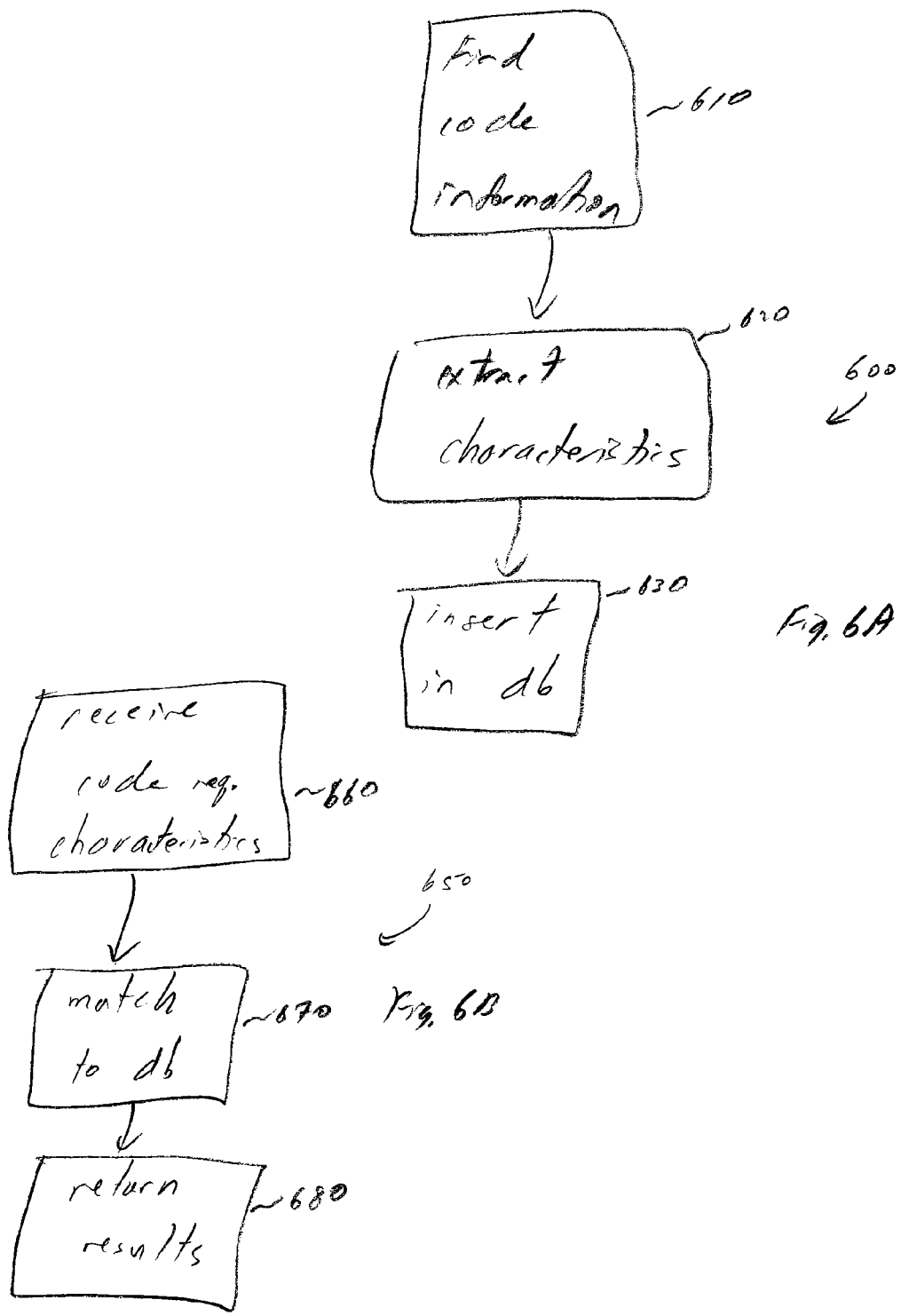

NOTIFICATION SYSTEM FOR SOURCE CODE DISCOVERY

CLAIM OF PRIORITY

This application claims priority to U.S. Provisional Patent Application No. 60/845,865, filed on Sep. 19, 2006, which is hereby incorporated herein by reference.

BACKGROUND

Development of software can be a tedious and time-consuming business. Software applications typically all do the same basic manipulations of data. The variation in how those manipulations occur and what the data represents leads to diversity in software. Thus, it is not unusual to use the same software routines or components in a variety of different applications.

While the same routines may be used, they may have variations which make individual instances of a routine differ slightly. Alternatively, the same routine may be plugged in, as-is, to a different (or related) application when the same type of data is processed. Thus, during software development, it may be advantageous to locate, manually or automatically, existing software which can be reused in whole or in-part.

Finding reusable software code is potentially simple, given an organized list of software components already in existence and a knowledge of what these components are. However, no typical software engineer has such information for all software the engineer has developed individually. Moreover, groups of software developers generally have only vague knowledge of what members of the group have developed, and little knowledge of what has been developed outside the group. Thus, it may be useful to develop a system which will allow organized access to software source code from various software applications or source code repositories. Moreover, it may be useful to categorize or otherwise organize such information, thus enabling access to the source code in an efficient manner.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

FIG. 2: An embodiment of notification of available search results displayed to user after creation of new method.

FIG. 5A: An embodiment of a process of automatically searching for software code.

FIG. 6A: An embodiment of a process of obtaining software code.

FIG. 6B: An embodiment of a process of searching a database of software code.

DETAILED DESCRIPTION

Figure 1:
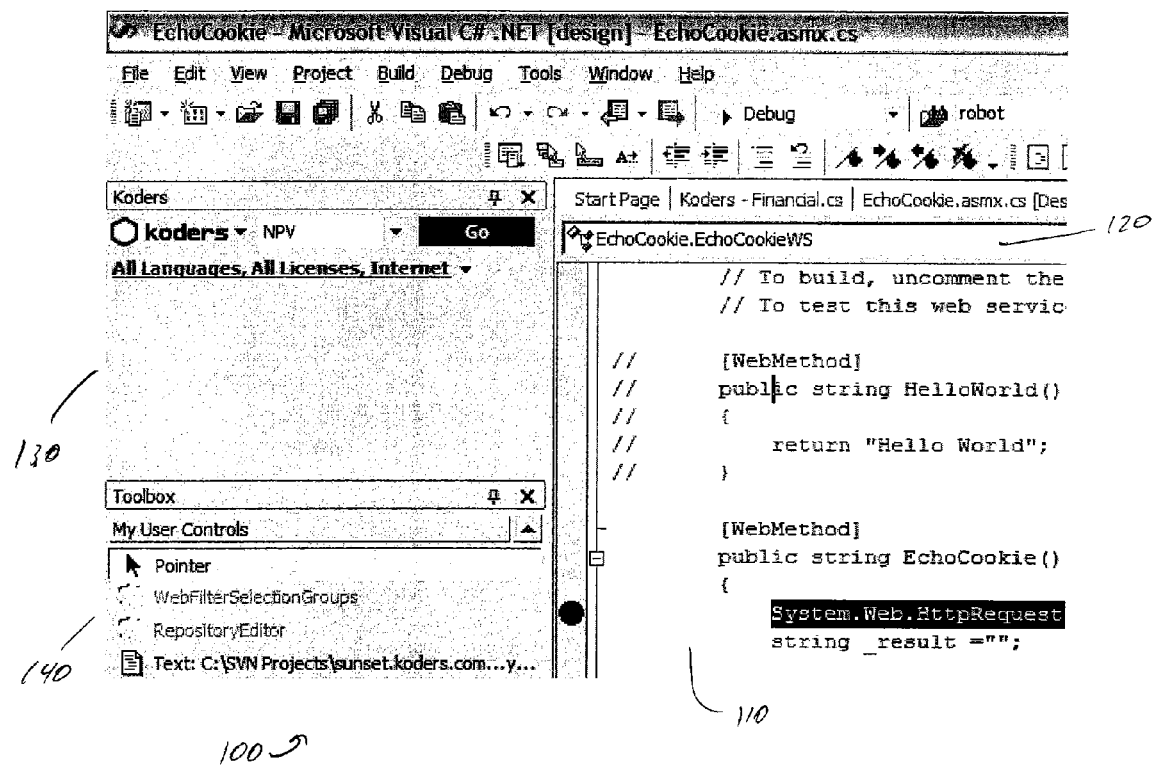
FIG. 1: Display of an embodiment of the component integrated within an editor.

A system, method and apparatus is provided for automatic notification of source code discoveries from source code databases. The discovered source code may be integrated into current source code. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In various embodiments, implementations may include some or all of the following features:

Integrating with an editor to detect when software developers create or modify structural elements of a software application such as namespaces, classes, interfaces, functions, methods, properties, fields and/or expressions.

Performing a background search when these elements are created or modified against one or more external source code databases in order to identify existing software source code that is similar to or related to the defined element.

Indicating to the developer through visual or other means the number and nature of matching results.

Allowing the developer to easily access the results by clicking a message or typing a special keyboard combination.

Presenting the results in such a way that they may be easily copied and pasted from the results into the developer's editor. Additionally, providing a way for a developer to easily download or otherwise obtain the results in their full context, for example, by downloading all the source code for the project in which the source code file results are contained.

Collecting statistics on searches and reused source code results in order to iteratively improve search results over time.

In general, reference to an editor in this document refers to any one or more of a number of different types of software. For example, an editor may be a text editor or an IDE (an Integrated Development Environment). Other examples include visual editors or browsers with some form of editing capability. Thus, reference to an editor should be understood as reference to something providing functionality for editing code.

Embodiments relate generally to the construction of software components which enable text-editor applications to make recommendations to the user regarding the integration of external content (such as source code) which may be reusable in the document (such as a software application) currently being developed, and more specifically to the application of such a system to the domain of software development.

Features of some embodiments include a software component that integrates with text editors designed specifically for software development—also known as integrated development environments (IDEs). The software component or module may be able to detect when a developer is creating or modifying defining elements of a software application such as namespaces, classes, interfaces, functions, methods, properties, fields and/or expressions. A related component may implement a system of searching one or more external databases containing source code to identify code that is similar to or related to the element that has been defined. This may work with a component implementing a system of notifying the developer of the number and nature of results which are found and a system of displaying results that enables the developer to easily copy-and-paste results into the application currently being developed. Searching may involve a system of indexing source code so that searching for similar or related source code can be performed quickly. This may also involve a system of recording searches and the results selected by developers in order to iteratively improve the ranking and display order of search results in the future.

Discussion of an embodiment with respect to its user interface may provide further insights into how a code search engine may be integrated with an editor. FIG. 1 illustrates display of an embodiment of a code search component integrated within an editor. Interface 100 includes classic elements of an editor along with a code search engine. Window 110 provides an editing environment for code. Location 120 provides an indication of what software code is currently being edited. Code search interface 130 provides an interface allowing for specification or selection of search parameters. Toolbox display 145 provides an illustration of the tools available for manipulation of the current code of window 110 and other functions of the editor. In the illustration of FIG. 1, no search has occurred, and parameters allowing for search of all types of code are selected.

Source code comes in a variety of shapes, sizes and forms. Various portions of source code may be referred to as systems, applications, libraries, components, modules, object, classes, methods, routines, procedures, functions, or snippets, for example. Any one or more of these portions may be suitable for detection, or as a result of a search in various embodiments. Also, note that reuse of other types of computer data, such as general text for example, may be similarly handled with a search engine and document management system, for example.

Figure 2:
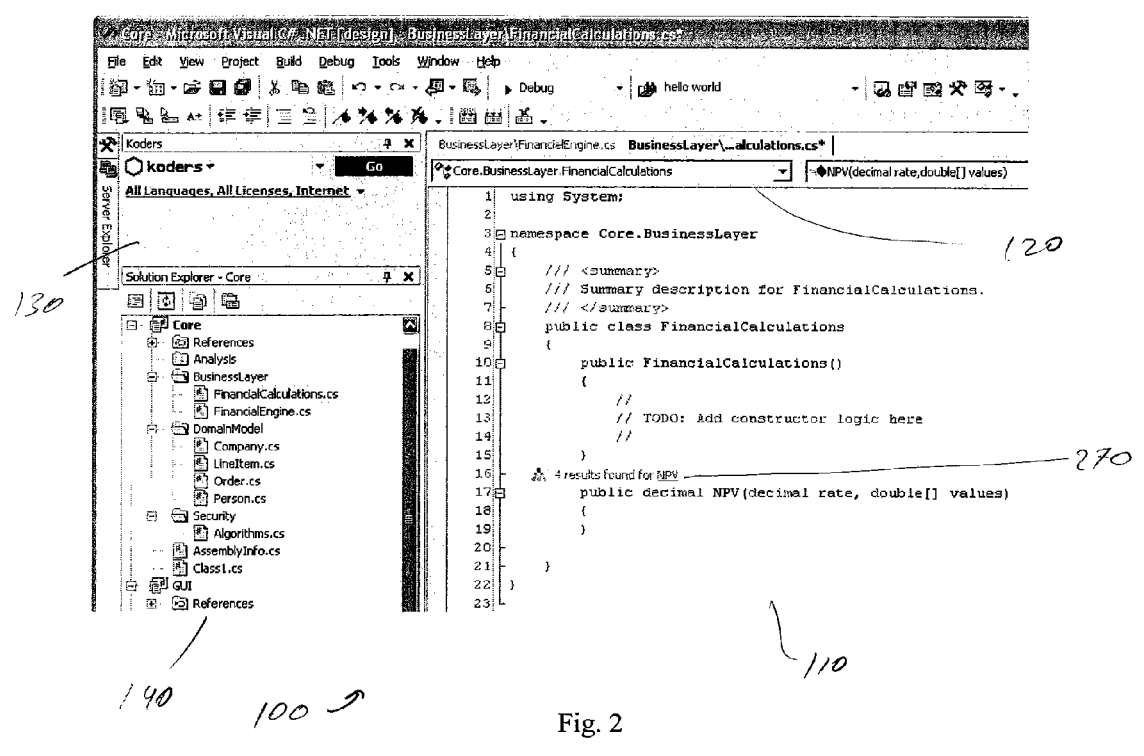

In response to either a request or changes in source code, a search may be initiated. Turning to FIG. 2, an embodiment of notification of available search results displayed to a user after creation of new method is displayed. Search notification icon 270 indicates that a potential match has been found for code currently being developed in window 110. The search is based on characteristics of code displayed in code display 110 of FIG. 1, and occurs in a background process while editing occurs. Searching may be triggered based on detection of new software code, or modification to existing code such as changing the API (or signature) of an existing method, object, function or other portion of code, for example. Clicking on icon 270 leads to a display of software code which were found by the search. Codespace display 140 provides an illustration of the overall codespace in which development is occurring, with an indication of the context of the current code of window 110. This view may assist in showing the overall context in which discovered code may be integrated.

Figure 3:
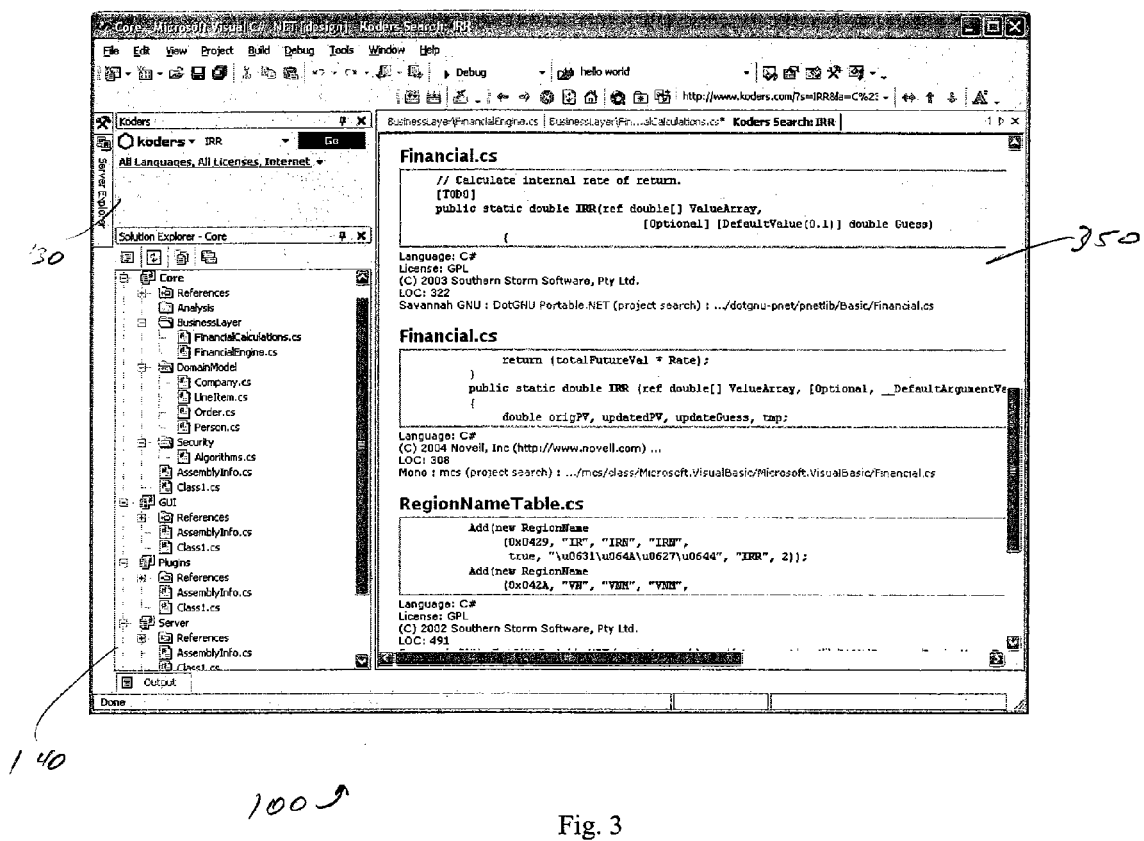
FIG. 3: An embodiment of a search results summary to (preferably) make it easy for a developer to visually filter results.

Alternatively, a listing of a variety of results may be provided. FIG. 3 provides an embodiment of a search results summary to (preferably) make it easy for a developer to visually filter results. Instead of showing all software code, a summary of results may be provided, as illustrated in display window 350. Each code portion is displayed with its API and information about where it may be found (and potentially what licensing restrictions it carries). The most useful solutions or most likely matches are displayed first in one embodiment.

Figure 4A:
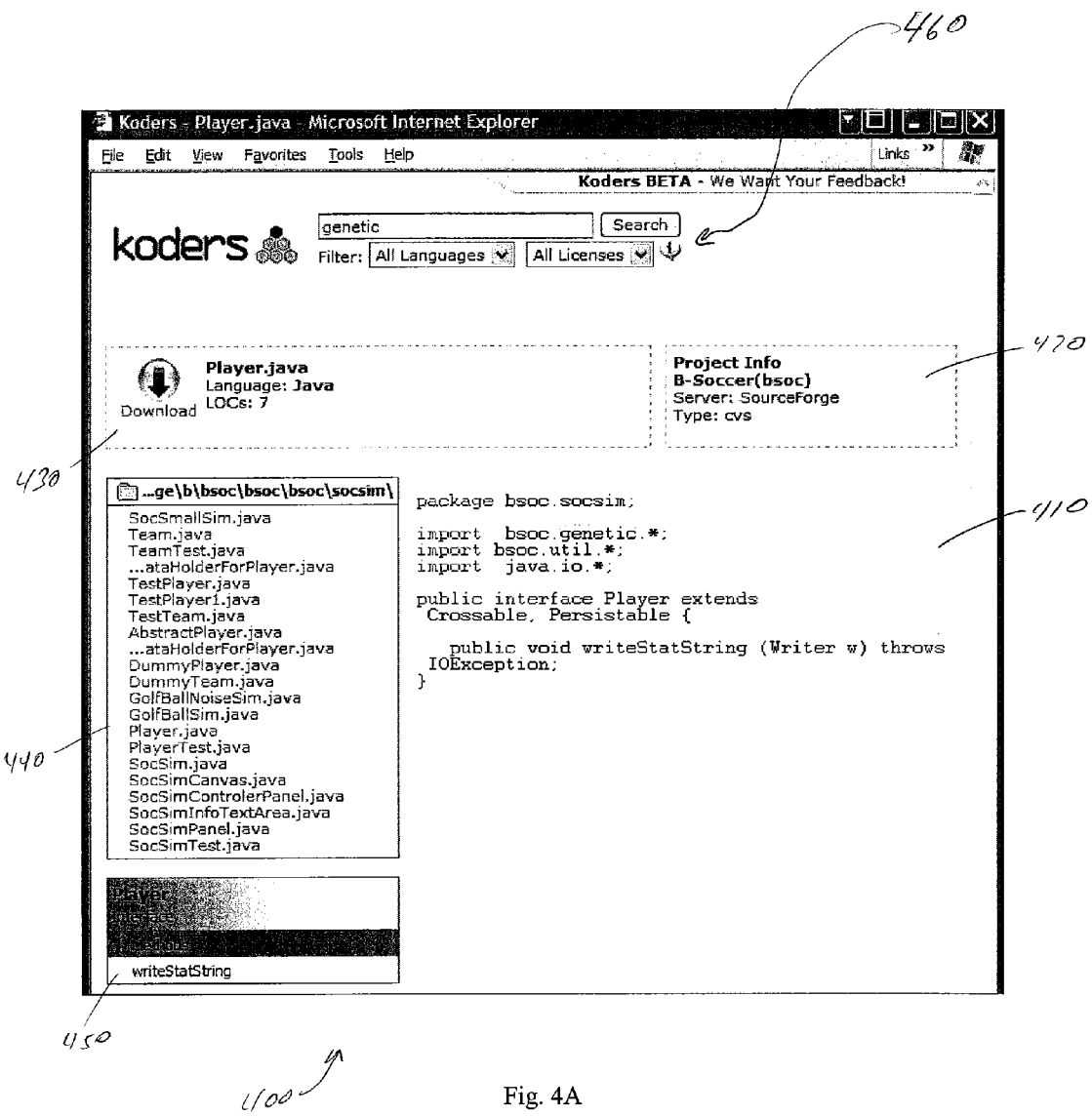
FIG. 4A: An embodiment of a detailed code view within a browser can be easily integrated into the current file via copy-and-paste.

A specific result may be further reviewed in a separate window. FIG. 4A illustrates an embodiment of a detailed code view within a browser which can be easily integrated into the current file via copy-and-paste. Interface 400 may be viewed in a browser such as Internet Explorer of Microsoft or Firefox, or a built-in browser of another application, for example. Code 410 is the actual code of the portion. Project information 420 indicates where the code originated, and potentially what licensing restrictions are carried with the code. Language information 430 indicates what language the code is in, and potentially what requirements the code has for integration (e.g. language version, specialized libraries, etc.) Context information 440 indicates what other modules are available along with the instant module. Interface data 450 provides information about the API of the instant module. Also provided is an opportunity to refine a search in search interface 460, including specification of languages, licenses, and keywords, for example.

Figure 4B:
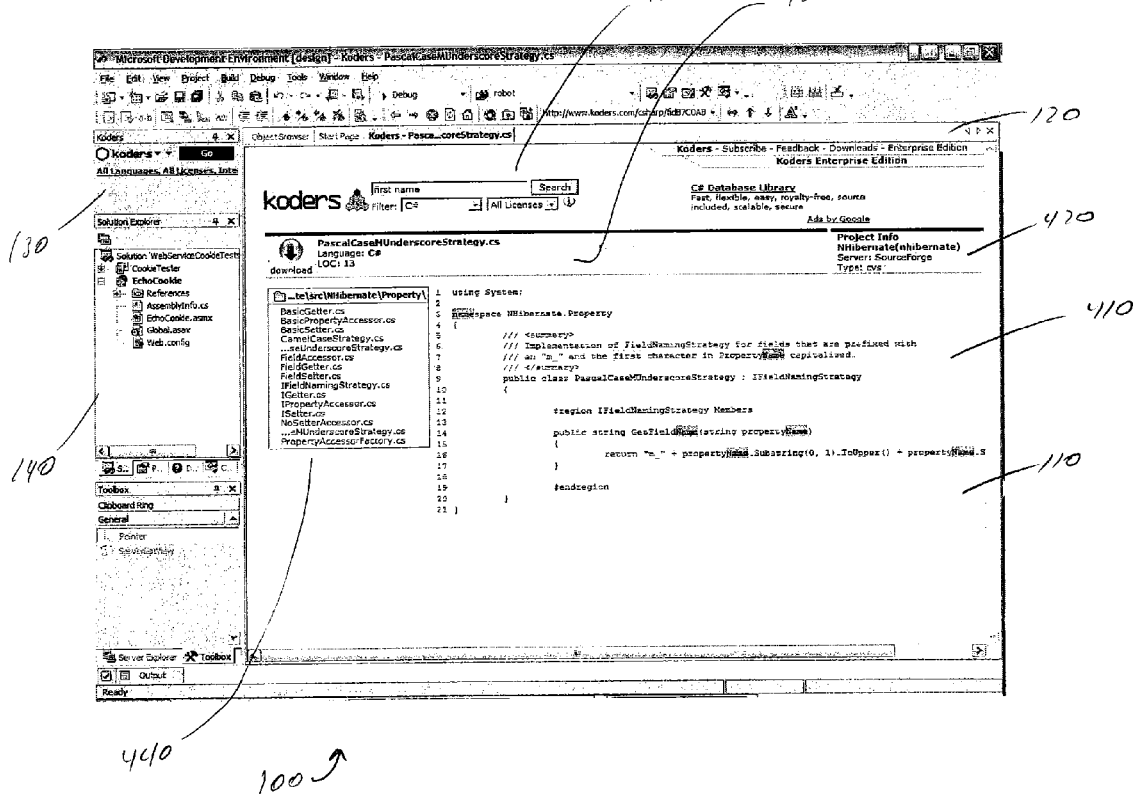
FIG. 4B: An embodiment of a detailed code view within an editor.

FIG. 4B illustrates a similar interface to that of FIG. 4A as may be incorporated into a development environment (an editor for example). Thus, the information about what software code is available may be displayed in conjunction with context information about development of a project. Material may be copy-and-pasted or otherwise integrated into the project.

A search may be initiated and performed either in reaction to writing code or responsive to a request. FIG. 5A provides an embodiment of a process of requesting software code. Process (method) 500 and other processes of this document are implemented as a set of modules, which may be process modules or operations, software modules with associated functions or effects, hardware modules designed to fulfill the process operations, or some combination of the various types of modules, for example. The modules of process 500 and other processes described herein may be rearranged, such as in a parallel or serial fashion, and may be reordered, combined, or subdivided in various embodiments.

A search request may be originated when a change is detected in a software module at module 510. Such a change may involve a change in parameters, editing the software code, or other changes discussed elsewhere in this document. Code information (search parameters) is extracted at module 520. Thus, an API or functions of software code may be extracted as a signature, for example. A search query or set of criteria are constructed at module 525 for submission to a search facility.

The search query is issued, and at module 530, the search request is received and executed. This may involve various search algorithms and database queries to find matches of varying quality. At module 535, the number of matches received is calculated and passed back to a client issuing the search query. At module 540, a determination is made as to how many results were found. If no results were found, the search is ignored at module 545 (presumably returning to module 510 to await detection of another change). Results of the search (if they exist) are presented to the user at module 550. A determination is then made at module 555 as to whether the user is activating (e.g. accessing) the search results. If not, at module 565, the results are hidden. Note that the results may be stored in a circular queue or other storage mechanism (data structure), allowing a user to backtrack after ignoring an initial notification to see what a search turned up. This allows for user second-guessing after, for example, realizing the software code may take more work than expected or remembering a prior piece of code which may be useful, for example.

If the search results are activated, in one embodiment, the search criteria and results are passed to a new window for review at module 570. At module 575, the user may then review the specifics of results, and copy-and-paste or otherwise integrate code into the present project, for example. Also, separate and apart from use of the search, statistics resulting from the search and user use of the search results may be stored at module 560, either in conjunction with the searches or after search and use of search results, for example. These statistics may simply be server-based (potentially only including search queries and results) or may be more inclusive.

Figure 5B:
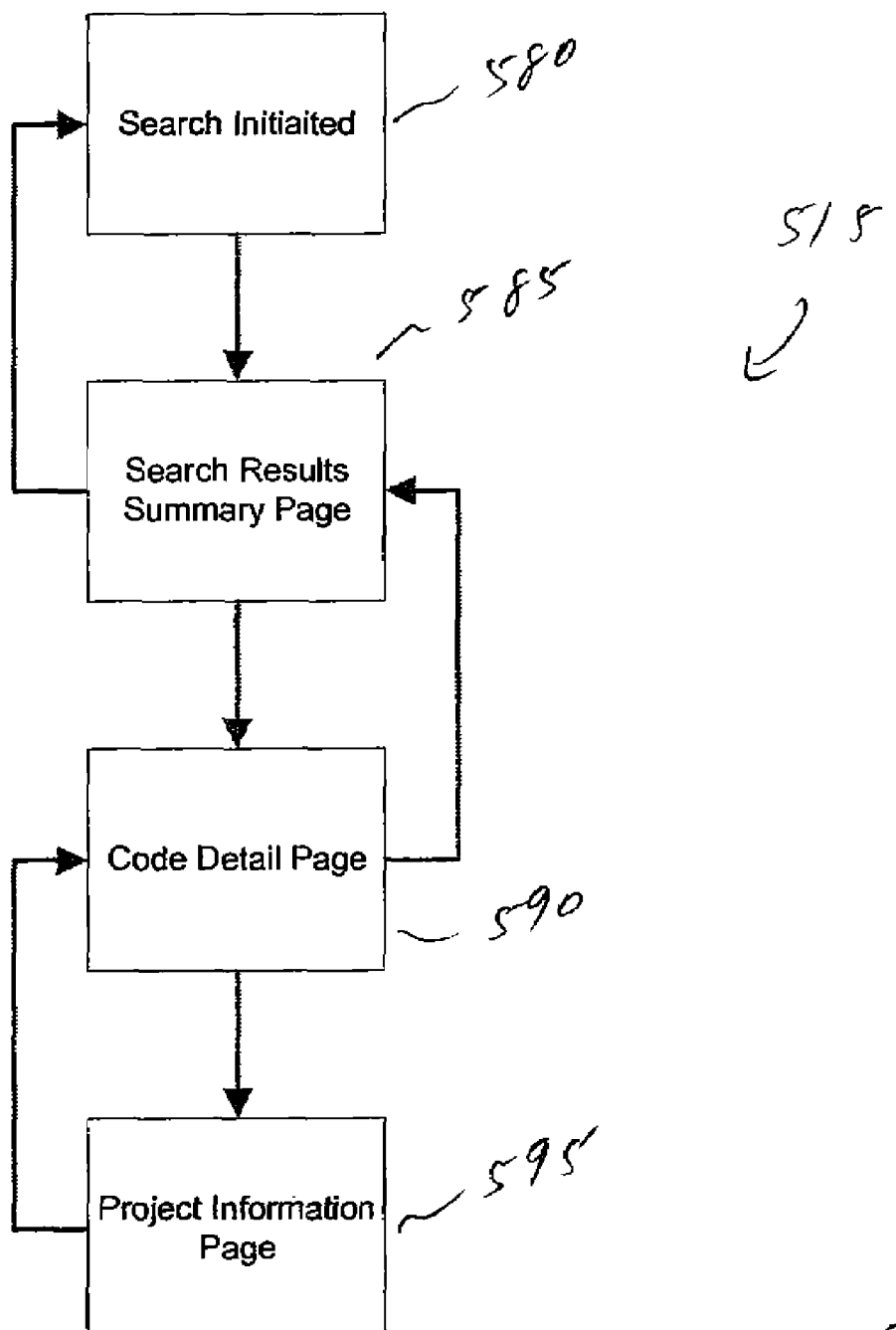
FIG. 5B: An embodiment of a process of requesting software code.

Alternatively, a search may be initiated by a user submission at a webpage or through a toolbar, for example. FIG. 5B illustrates a user-initiated search process. Process 515 includes search initiation, presenting a results summary page, providing detailed information, and returning to a project page.

Process 515 begins with initiation of a search at module 580. This may involve providing various search criteria, for example. At module 585, search results are provided responsive to the search criteria. Specific software code may be displayed at module 590. The user may also review project information (of the project from which the source came) at module 595, and may find other code to integrate, for example.

Software code may be collected in a variety of ways. FIG. 6A provides an embodiment of a process of obtaining software code. Process 600 includes finding code information at module 610. This may include interfacing with a version control system or revision control system. This may also include code submissions made by developers, for example. For internal systems, specific version control systems may be used. For other systems, public sources of code can be used. Characteristics of the code are extracted at module 620, including information such as API, language, license, etc. This information is inserted into a database at module 630, to allow for rapid searching.

With information about software code collected, the software code may then be searched. FIG. 6B provides an embodiment of a process of searching a database of software code. Process 650 includes receiving code request characteristics, such as language, function, API, etc. at module 660. This further includes matching such characteristics to information in a database at module 670 (such as through database requests, for example). Results are then returned at module 680.

Figure 7:
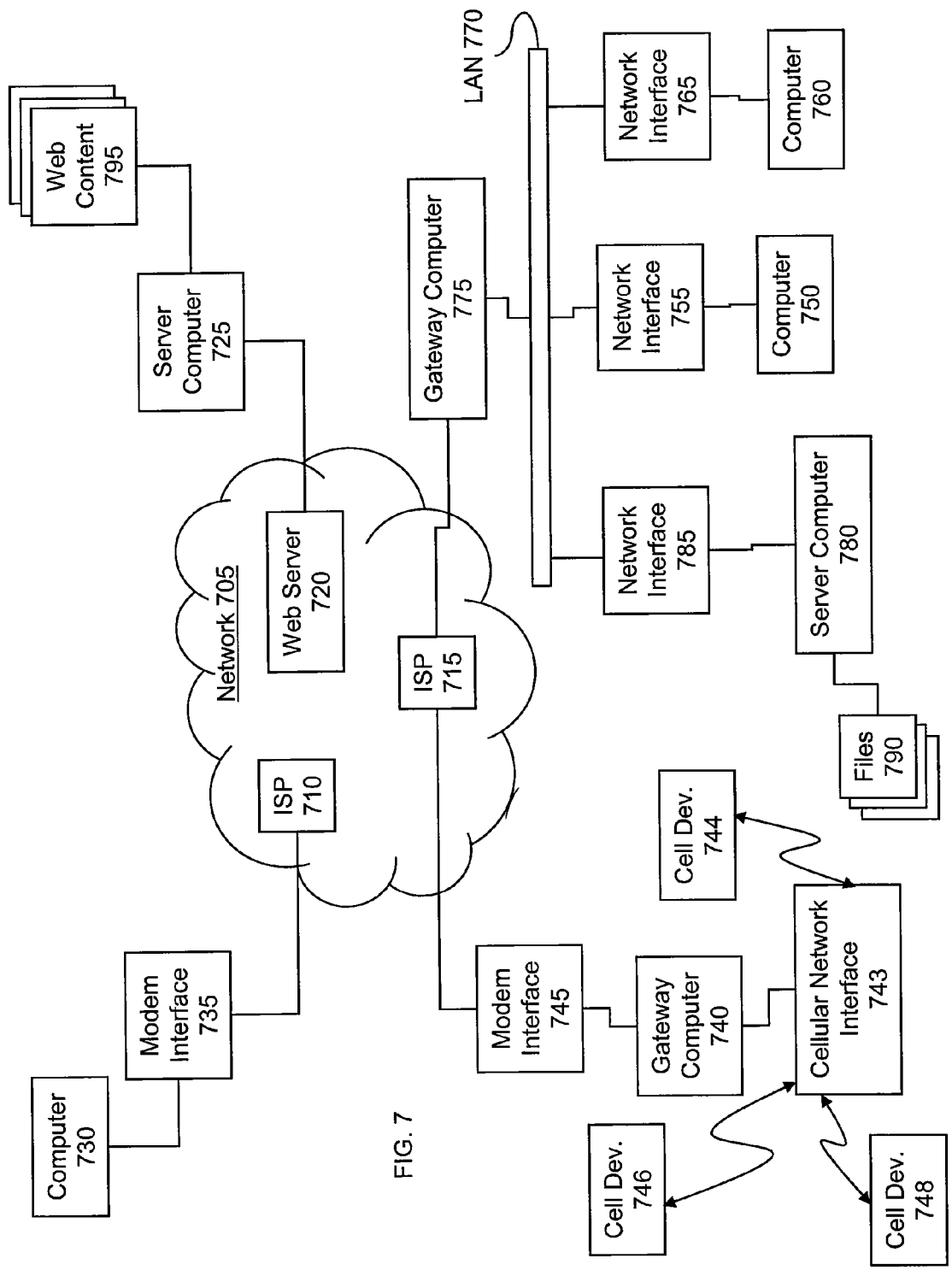
FIG. 7: An embodiment of a network which may be used with various other embodiments.
Figure 8:
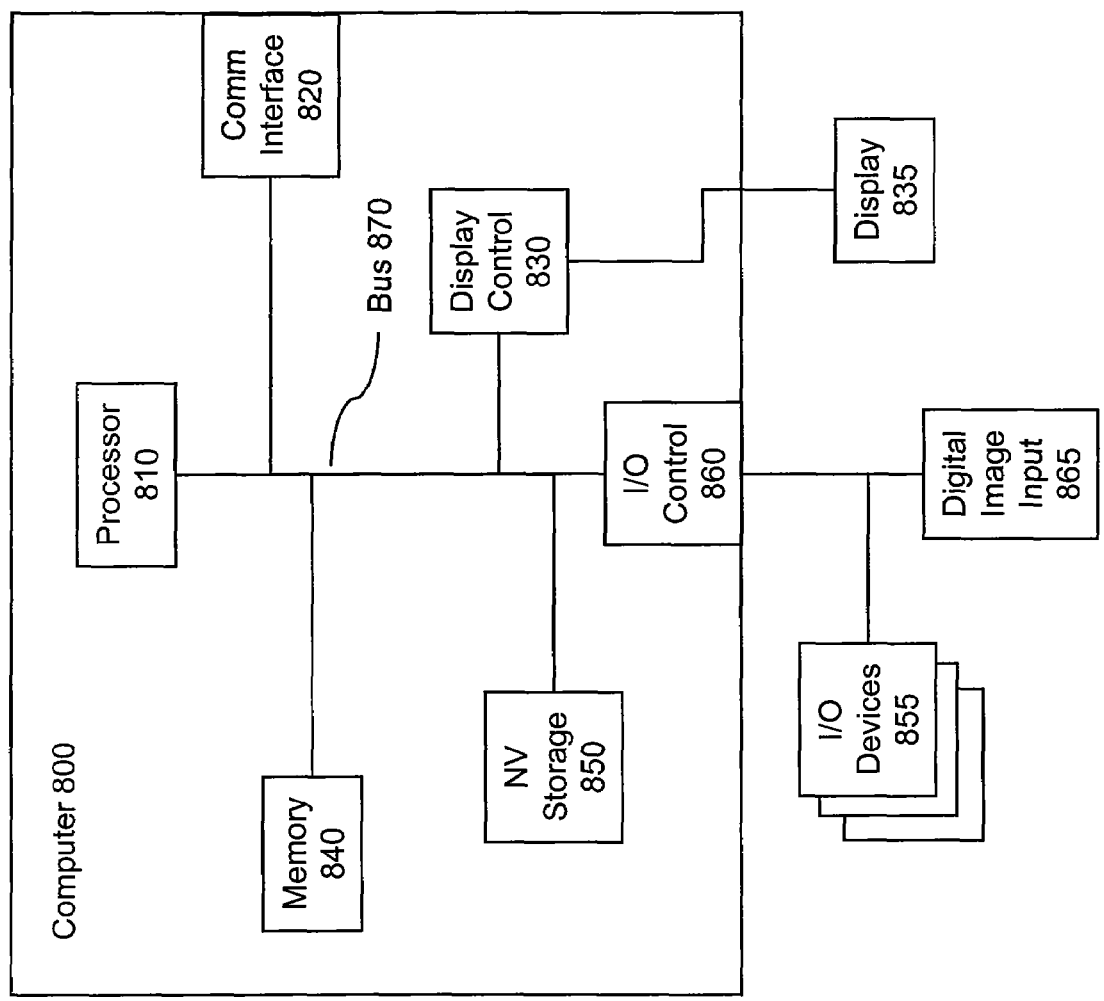
FIG. 8: An embodiment of a computer or machine which may be used with various other embodiments.

The following description of FIGS. 7-8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet, along with a cellular network and related cellular devices. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Cellular network interface 743 provides an interface between a cellular network and corresponding cellular devices 744, 746 and 748 on one side, and network 705 on the other side. Thus cellular devices 744, 746 and 748, which may be personal devices including cellular telephones, two-way pagers, personal digital assistants or other similar devices, may connect with network 705 and exchange information such as email, content, or HTTP-formatted data, for example. Cellular network interface 743 is coupled to computer 740, which communicates with network 705 through modem interface 745. Computer 740 may be a personal computer, server computer or the like, and serves as a gateway. Thus, computer 740 may be similar to client computers 750 and 760 or to gateway computer 775, for example. Software or content may then be uploaded or downloaded through the connection provided by interface 743, computer 740 and modem 745.

Client computer systems 730, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 750 and 760, although as shown in FIG. 7, the connections are not the same as for more directly connected computer systems. Client computer systems 750 and 760 are part of a LAN coupled through a gateway computer 775. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a personal device that can be used as a cellular telephone (744, 746 or 748) or similar personal device. Such a device can be used to perform many functions depending on implementation, such as telephone communications, two-way pager communications, personal organizing, or similar functions. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel pentium microprocessor or Motorola power PC microprocessor, a Texas Instruments digital signal processor, or some combination of the two types or processors. Memory 840 is coupled to the processor 810 by a bus 870. Memory 840 can be dynamic random access memory (dram) and can also include static ram (sram), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® from Microsoft Corporation of Redmond, Wash., and their associated file management systems. Another example of an operating system software with its associated file management system software is the Palm® operating system and its associated file management system. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display-i/o controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
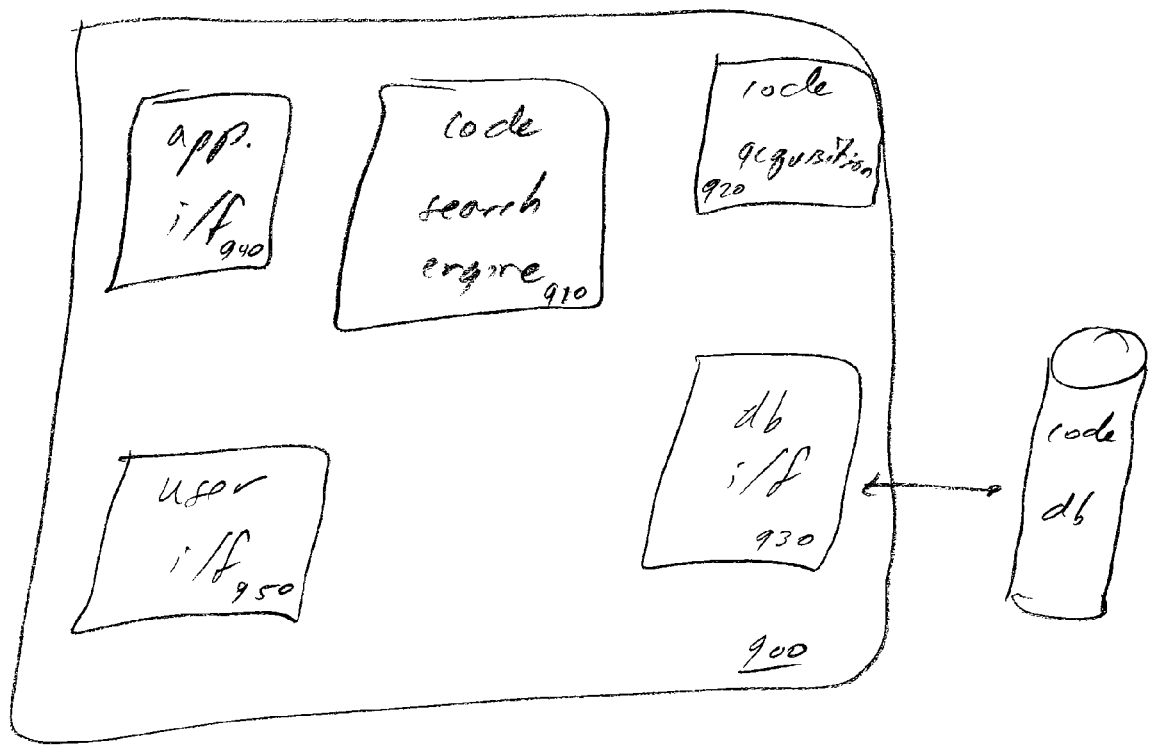
FIG. 9: An embodiment of a medium which may be used in conjunction with an application, for example.
Figure 10:
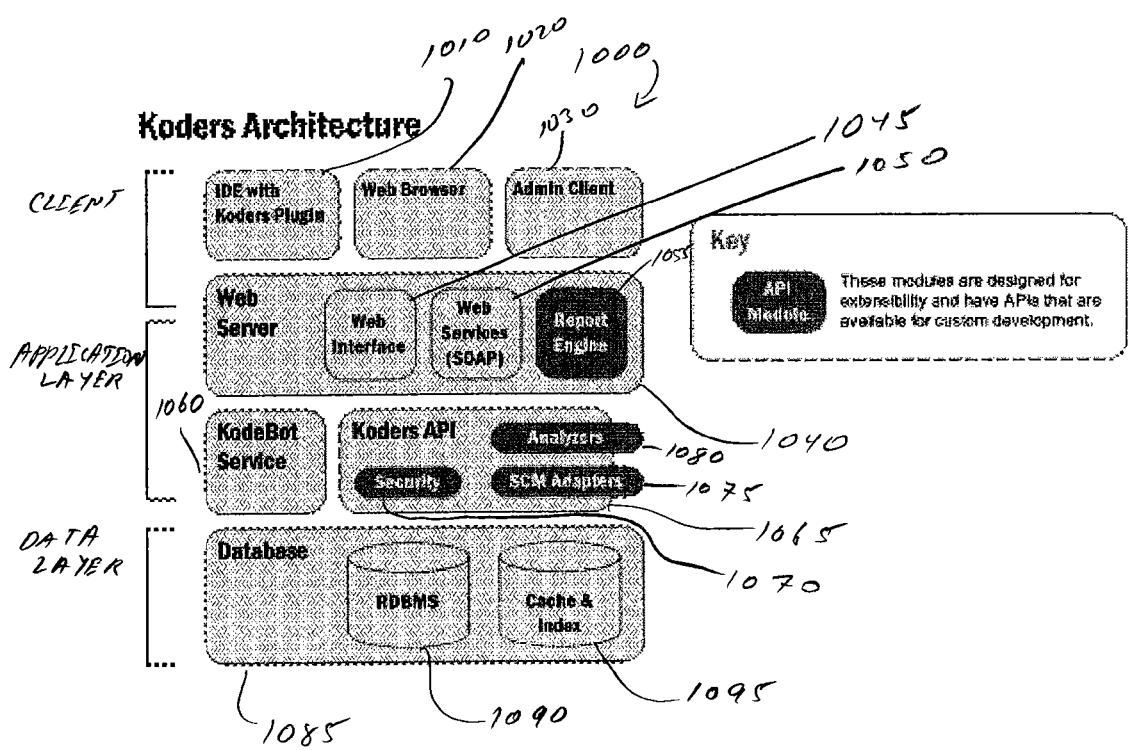
FIG. 10: An alternate embodiment of a machine-readable medium is provided.

The search engine and application interface may be embodied in a medium in some embodiments. FIG. 9 illustrates an embodiment of a medium which may be used in conjunction with an application, for example. Medium 900 includes a code search engine, code acquisition module, database interface, user interface and application interface. Code search engine 910 may interact with the user interfaces and the database interface to facilitate searching for software code. Acquisition module 920 may interface with code sources such as revision control systems, and accept code submissions. Database interface 930 may accept database entries and requests for information from a database 960. Application interface 940 may work with an application to allow search requests to search engine 910, such as by providing a plugin, toolbar, or other interface. User interface 950 may similarly allow for search requests or code submission through the web (separate from an editor).

Another embodiment of a machine-readable medium may be used to implement the methods and systems of various embodiments. A source code search system as embodied in medium 1000 may be implemented as three primary layers, each potentially containing several components. These components may include a source code database index (index), a source code crawler (kodebot), a web application front-end (web interface), and desktop client plugins (plugins).

The index may contain two primary schemas—a registry of repositories and projects—essentially a map of internal source code databases, as well as a high-performance searchable source code cache (implemented as cache 1095 in this embodiment). The project registry, system statistics and other metadata may be maintained in an SQL Server (a relational database 1090) for example. Database 1085 thus includes the database 1090 and search portions 1095. Alternate databases options are also available.

The kodebot 1060 may be implemented as a service process which synchronizes the index with external version control systems (also known as software configuration management systems (SCMs), such as CVS, Subversion, or ClearCase from IBM, for example) within an organization, for example. Koders API 1065 may allow for interaction with other software services and data repositories, for example. Thus, SCM adapter 1075 may allow for an interface with SCMs, analyzers 1080 may be customized to extract signature information from software code, and security API 1070 may be used to program security measures for the system 1000. The web server 1045 may allow users to search the index 1095, view related reports, and update the project registry, for example. This may occur in part through use of web interface 1045, web services 1050, and report engine 1055, for example. The admin client 1030 (sometimes referred to as the kodebot client) may serve as the administrative interface for maintenance of system configuration, security policy, and the project registry, for example.

The plugins 1010 may be optional components of the system that allow developers to search a code server and database within the context of a development environment, for example. Currently, plugins may be used with popular applications such as Visual Studio .NET, Eclipse and Firefox, for example. Such plugins may have different functionality incorporated for different applications. Developers can potentially download and install these components at any time. Web browser 1020 may be a conventional web browser such as Internet Explorer or Firefox, for example.

While the discussion here relates to plugins, the functionality for notification of discovered code can be implemented in an editor in a more tightly coupled manner. Thus, one may incorporate such functionality in building the editor directly, rather than requiring the functionality to be segregated in a plugin. Capturing change events may be part of the editing process, background searches may be implemented in the editor, and display of results may similarly be tightly integrated with the rest of the editor user interface—such as by including a code search area in the user interface instead of popping up a separate code search window, for example.

In various embodiments, methods and apparatus may be provided, and a further discussion of various features in some embodiments may be illustrative. An embodiment may include a method of notifying software developers of existing reusable source code from external databases which may be integrated into their current project. Similarly, an embodiment may include a method of integrating a software component with a text editor, integrated development environment (IDE), or other editor.

Additionally, embodiments may include a method for detecting each time a developer is creating or modifying structural elements of a source code file from within an editor. This method may include integrating with the editor using available APIs and methods to capture developer keyboard sequences and editor-specific events. The method may further include detecting the programming language the developer is writing source code in either by analysis of the file, or via API methods provided by the editor. The method may also include detecting the creation or modification of classes, interfaces, functions, methods, properties or fields by analyzing keyboard sequences for syntax used to define such elements as specified by the grammar of the particular programming language. The method may include extracting the element name and related signature information if available.

Moreover, embodiments may include a method of constructing a search query from the programming language and element name extracted. The method may involve signature information of the defining element as a search parameter. The method may further include specifying the breadth of desired results the developer would like to receive. Such specification may include 'exact matches', 'better matches', or 'more matches' for example.

In issuing a search query to one or more external source code databases, the search mechanism may be implemented to avoid interrupting or distracting the user while the search is being issued and a response returned. Similarly, the search mechanism may provide a response containing the number of matching results and textual indication of the nature of those results. Likewise, the method can be issued (a search can be issued) to remotely located source code databases connected to the computer using a protocol. For example, the method may use HTTP/SOAP for the network protocol Additionally, embodiments may implement a method of notifying the developer through visual or other means the number and nature of matching results. This may include an audible notification. Such a notification need not require the developer to stop typing, or otherwise disrupt their work. Moreover, the method may involve hiding the visual notification if the user does not activate the link after a fixed or predetermined number of seconds. The developer may easily access search results, such as by allowing the developer to click the message to view the results or allowing the developer to type a specific keyboard combination to view the results.

Embodiments may further include a method of presenting the results in such a way that they may be easily copy-and-pasted from the results into the developer's editor. For example, this method may include opening a new web browser window within the editor. The method may also include constructing a URL which contains the database location and search criteria. The method may further include passing the URL to the newly opened web browser window. The method may also include displaying the resulting results in the web browser window. The method may allow the developer to navigate as needed. Likewise, the method may allow the developer to copy source code off of pages displayed in the web browser window.

Embodiments of methods may further incorporate user preferences to improve search accuracy. This may involve allowing a user to create a list of certain terms which will not be searched. Similarly, the method may be implemented to remember each search conducted and not re-issue repeat searches during the time the editor is active.

Figure 11A:
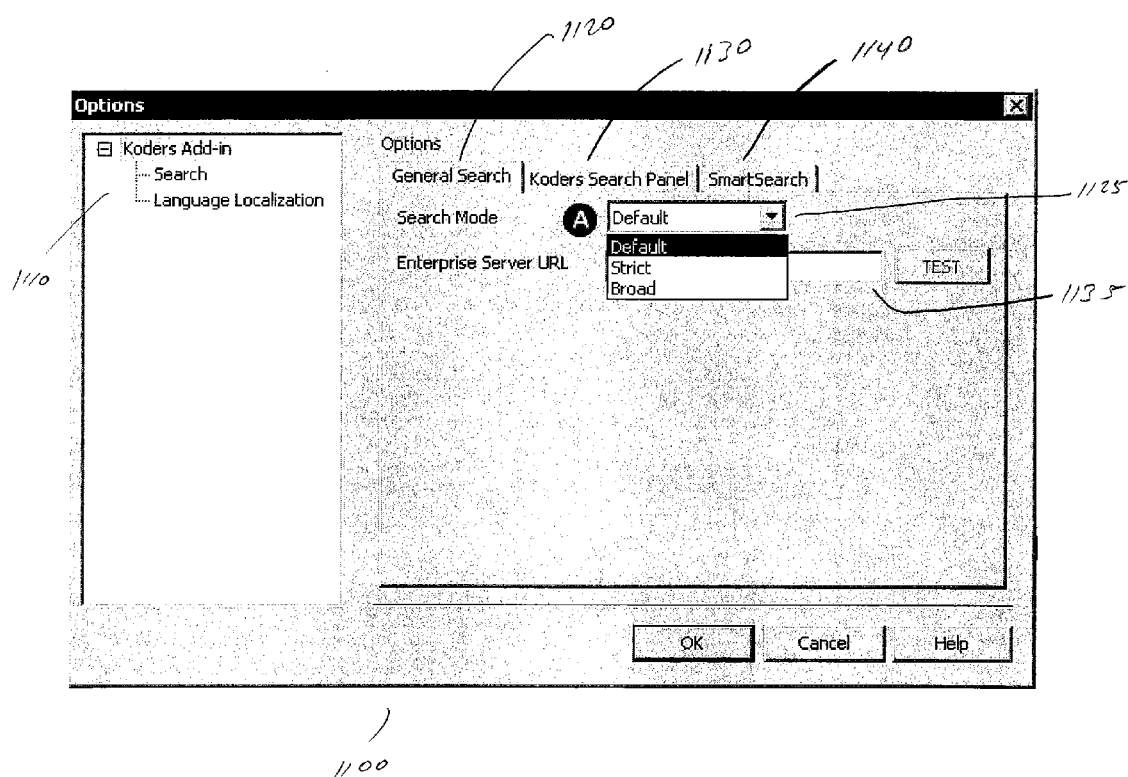
FIG. 11A: An embodiment of a display for selection of search options is provided.

An illustration of how one may use various different options in searching for code and alternatives for selection of such options may be instructive. FIG. 11A: An embodiment of a display for selection of search options is provided. Display 1100 provides a part of a user interface useful for selection of options related to searching for code. Display 1100 includes a feature map 1110 and tabs 1120, 1130 and 1140. However, other displays with similar features or functionality may be useful in such a context.

Feature map 1110 provides an indication of what features are available in the software for selection of options. General search tab 1120 provides for simple selection of basic options involved in searching for code. Thus, a search mode drop-down menu 1125 is provided, allowing one to select a type of search. This type of search is illustrated as a default search, a strict search or a broad search. Each selection may imply a set of parameters and associated values, such as parameters relating to relevance of search results to a search query. Also provided is a box 1135 for entry of an enterprise server URL. Box 1135 may be used to enter a location where an enterprise server may be found. In such a situation, the enterprise server may control aspects of the search, or may provide access to the codebase to be used for the search, for example.

Figure 11B:
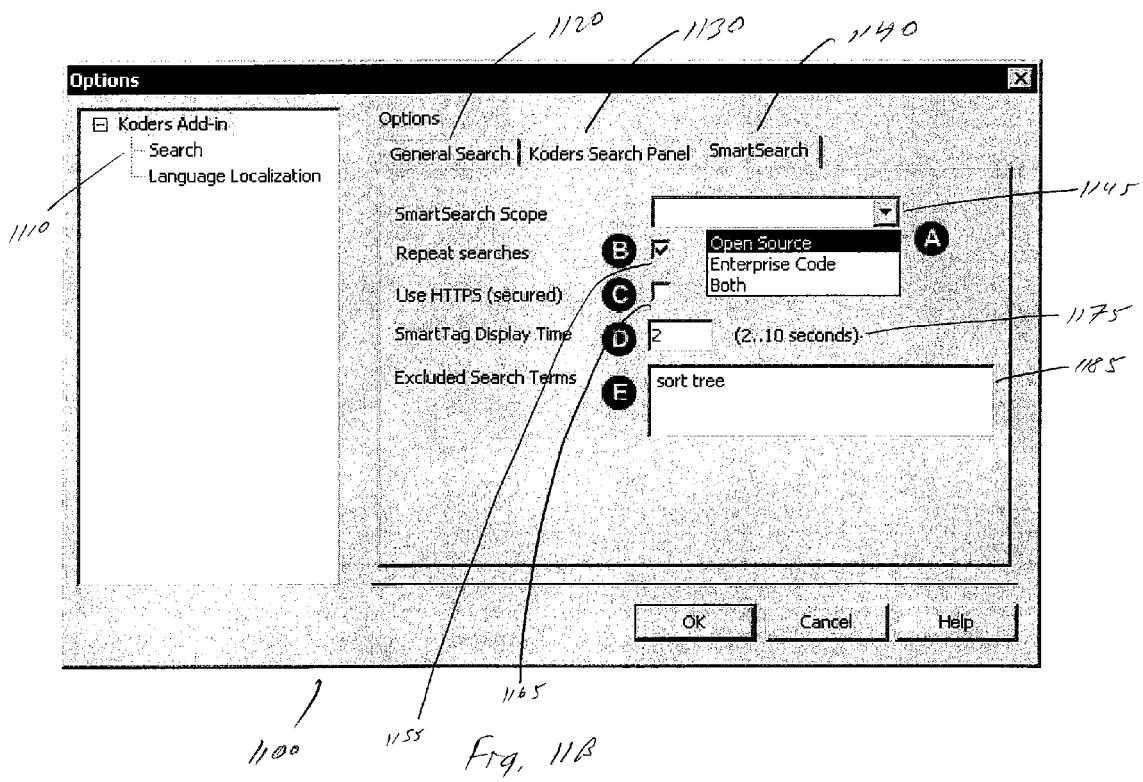
FIG. 11B: Another embodiment of a display for selection of search options is provided.

Also included in display 1100 are koders search panel tab 1130 and smart search tab 1140. The search panel tab 1130 provides access to the actual search window—where queries may be entered or refined and results may be displayed. FIG. 11B: Another embodiment of a display for selection of search options is provided. In particular, the smart search tab 1140 is illustrated.

Smart search tab 1140 allows for advanced or specific search criteria to be tuned—it provides a set of advanced options. Scope drop-down menu 1145 allows for scope of a search to be defined, allowing for open source searching, enterprise searching, or both. Repeat searches box 1155 allows a user to specify whether a search may be conducted more than once (such as when the user produces similar code a second or succeeding time). Security box 1165 provides an option to select use of secure communication when using the HTTP protocol for search requests. Display time box 1175 allows a user to specify interaction between search results and the rest of a user interface—providing for quick or long (duration) notification of search results when the user is engaged in other tasks. Excluded search terms box 1185 allows a user to enter search terms which should not be among the results of a search—thereby allowing a user to exclude either approaches considered and rejected, or material which has similar properties but is known to be improper, for example. Clearly, other search features may be specified in other embodiments. However, these search features have been found to be useful in one embodiment, and are illustrative of the type of features one may use.

Likewise, embodiments may include a method of indexing source code so that it may be searched quickly. The method may include a method of (or protocol for) specifying the location of source code projects. The method may also involve a method of retrieving and analyzing source code. The method may also include a method of compiling source code into searchable indexes. Likewise, the method may include a method of exposing a search interface to remote clients over the network that utilizes protocols such as HTTP/SOAP.

Along with the various processes of retrieving source code, embodiments may include a method of recording statistics. This may involve recording each search, recording when a developer chooses to download a source code file, and a method of recording when a user copies source code from a web page, for example. The method of recording copying of source code may involve embedding special code in the web page to detect mouse events, detecting when a user starts to copy by clicking and holding a mouse button down, detecting when the user has released the mouse button, and sending a message to the server indicating that a copy and paste event has occurred. Recording statistics may also involve recording a correlation between a search and the result(s) that was downloaded or copied by the developer.

With statistics recorded, embodiments may implement a method of applying statistics to improve search results over time. This method may include assigning search results files a score. The method may further include increasing the default score for files based on how frequently they are downloaded or copied by developers. Also, the method may involve further increasing the score for a particular file when it has been shown to be downloaded or copied more than once by developers issuing the same search. Likewise, the method may include sorting search results so that matching resultant files shown in order of score, highest score first, and lowest score last.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:

1. A computer implemented method, comprising:
    running a background component to continuously monitor a source code editor running in the computer;
    detecting a new source code or source code change entered within the source code editor using the background component;
    capturing the new source code or source code change at a time the new source code is entered within the source code editor;
    extracting the new code or code change and parsing the new code to extract related defining or structural elements of the source code;
    automatically constructing a search criterion based on the new source code and its defining elements detected by parsing the new source code entered within the source code editor;
    issuing a search request to a search engine including passing the automatically constructed search criterion as parameters to find source code that has the same or similar defining elements as the new source code or changed source code which the search criterion was constructed from;
    conducting a search based on the constructed search criterion, including conducting the search on source code indexed prior to conducting the search so that the conducted search is conducted more rapidly than without the indexing, the source code indexing including recording prior searches and search results and indexing such prior searches and search results in order to improve the quality and display order ranking of future search results;
    receiving a search result in response to the search conducted based on the search criterion;
    presenting the search result in a search result window associated with the source code editor; and
    providing an interface configured so that a user can copy and paste or otherwise integrate the search results from the search result window into a source code for the purpose of source code reuse and to avoid rewriting preexisting source code.

2. The method of claim 1, further comprising:
    presenting meta data information associated with the search result, wherein the meta data includes non-structural information and is not limited to structural information about the source code.

3. The method of claim 2, further comprising:
    opening a user interface displaying the search result, which search result might be deemed invalid by a code compiler.

4. The method of claim 3, further comprising:
    copying source code, wherein the copied source code includes implementations of whole methods and/or whole classes which include one or many lines of code from the search result responsive to a user request.

5. The method of claim 2, wherein the non-structural information meta data includes meta data information about the license that governs the code identified and presented in the search results, and meta data information about how many lines of code are presented by the search result.

6. The method of claim 2, wherein the related defining or structural elements of the source code are selected from name spaces, classes, interfaces, functions or methods and their signatures.

7. The method of claim 2, wherein the returned search results include a plurality of lines of source code as a single search result.

8. The method of claim 1, further comprising: searching a code database that includes source code based on the search criterion.

9. The method of claim 8, further comprising: generating the search result in response to searching the code database.

10. The method of claim 1, further comprising:
    hiding the search result that was presented if a user of the source code editor does not activate the presented search results.

11. The method of claim 1, further comprising:
    opening a user interface displaying the search result; and
    copying data from the search result responsive to a user request.

12. The method of claim 1, wherein:
    the search criterion is further based on context of the source code change.

13. A computer implemented method as in claim 1, wherein the presenting the search result in a search result window associated with the source code editor further includes presenting the search result includes an application program interface (API) and information about where search results may be found and optionally what licensing restrictions the search result carries, and wherein the search results are ordered to first present the most useful search result solutions or most likely search result matches.

14. A computer implemented method as in claim 13, further including any licensing restrictions the search result carries.

15. A computer implemented method as in claim 1, wherein the constructing a search criterion further includes:
    constructing a search query from the programming language and element name extracted;

using signature information of the defining element as a search parameter; and specifying the breadth of desired results the developer would like to receive, wherein the specifying the breadth is selected from the set of breadth parameters consisting of exact matches, better matches, and more matches.

16. A computer implemented method as in claim 1, wherein the related defining or structural elements are part of the new code or changed code or are elements surrounding the new code.

17. A computer implemented method as in claim 16, wherein the elements surrounding the new code or changed code include a method declaration that is a defining element of the new code being written or the code being changed that implements a method of the code.

18. A computer implemented method as in claim 1, wherein the conducting a search based on the constructed search criterion further includes:

indexing source code prior to the conducting of the search so that the search is conducted more rapidly than without the indexing; and the indexing including recording searches and search results selected by developers and indexing such search results in order to iteratively improve the ranking and display order of future search results.

19. A method implemented using a computer, the method comprising:

running a background component to continuously monitor a source code source code editor running in the computer having a processor for executing instructions;

detecting a new source code or source code change entered within the source code editor using the background component;

capturing the new source code or source code change at a time the new source code is entered within the source code editor;

extracting the new source code or source code change and parsing the new source code to extract related defining or structural elements of the source code;

automatically constructing a search criterion based on the new source code and its defining elements detected by parsing the new source code entered within the source code editor; wherein constructing the search criterion includes conducting the search on source code indexed prior to conducting the search so that the conducted search is conducted more rapidly than without the indexing, the source code indexing including recording prior searches and search results and indexing such prior searches and search results in order to improve the quality and display order ranking of future search results;

issuing a search request to a search engine including passing the automatically constructed search criterion as parameters to find source code that has the same or similar defining elements as the new source code or changed source code which the search criterion was constructed from;

searching a code database based on the automatically constructed search criterion;

generating search results responsive to searching the code database;

receiving the search results;

presenting information related to the search results;

presenting the search results;

opening a user interface displaying the search results; and copying data from the search results responsive to a user request.

20. A tangible machine readable storage medium having a memory to store a set of instructions and adapted for execution by a processor, wherein the set of instructions when executed performs a method, the method comprising:

running a background component to continuously monitor a source code editor running in the computer;

detecting a new source code or source code change entered within the source code editor using the background component;

capturing the new source code or source code change at a time the new source code is entered within the source code editor;

extracting the new source code or source code change and parsing the new source code to extract related defining or structural elements of the source code;

automatically constructing a search criterion based on the new source code entered within the source code editor; wherein constructing the search criterion includes conducting the search on source code indexed prior to conducting the search so that the conducted search is conducted more rapidly than without the indexing, the source code indexing including recording prior searches and search results and indexing such prior searches and search results in order to improve the quality and display order ranking of future search results;

issuing a search request to a search engine including passing the automatically constructed search criterion as parameters to find source code that has the same or similar defining elements as the new source code or changed source code which the search criterion was constructed from;

conducting a search based on the constructed search criterion;

receiving a search result in response to a search conducted based on the search criterion; and presenting the search result within the source code editor.

21. The tangible machine readable storage medium of claim 20, wherein the method further comprises:

presenting meta data associated with the search results.

22. The tangible machine readable storage medium of claim 21, wherein the method further comprises:

opening a user interface displaying the search result.

23. The tangible machine readable storage medium of claim 22, wherein the method further comprises:

copying data from the search result responsive to a user request.

24. The tangible machine readable storage medium of claim 20, wherein the method further comprises:

hiding the search result that was presented if a user of the source code editor does not activate the presented search result.

25. The tangible machine readable storage medium of claim 20, wherein the method further comprises:

opening a user interface displaying the search result; and copying data from the search result responsive to a user request.

26. The tangible machine readable storage medium of claim 20, wherein the method further comprises:

searching a code database based on the search criterion.

27. A computer implemented method comprising:

running a background component to continuously monitor a source code available within a source code editor of the computer;

using the background component to detect a new entry made by a code entrant to the source code;

capturing the new entry at a time the code entrant makes the new entry to the source code within the source code editor and parsing the new code to extract related defining or structural elements of the source code such as name spaces, classes, interfaces, functions or methods and their signatures;

programmatically constructing a search criterion based on the new entry and its defining elements detected by parsing the new entry entered by the code entrant;

using the background component to search within a previously indexed database, wherein constructing the search criterion further includes conducting the search on source code indexed prior to conducting the search so that the conducted search is conducted more rapidly than without the indexing, the source code indexing including recording prior searches and search results and indexing such prior searches and search results in order to improve the quality and display order ranking of future search results;

using the programmatically constructed search criterion as parameters to find source code that has the same or similar defining elements as the or changed code which the search criterion was constructed from;

presenting results of the search to the code entrant; and providing a user interface configured to allow a user to copy paste or otherwise integrate search results from the result window into his code for the purpose of code reuse and to avoid rewriting preexisting code.

28. The method of claim 27, wherein the code entrant is a user of the computer.

29. The method of claim 27, wherein the source code is available within a code-entry space of the source code editor, and wherein the results of the search are displayed within the code-entry space of the source code editor.

30. The method of claim 27, wherein the source code is available within a code-entry space of the source code editor, and wherein the results of the search are displayed in a new window associated with the source code editor.

31. The method of claim 27, wherein the presented results of the search include at least:
a summary of source code derived from the results of the search;
and at least one of:
a source tag to indicate the origin of a source code identified by the results of the search; or
a licensing restriction associated with a source code identified by the results of the search if there is any licensing restriction; or
the number of lines of code of the source code suggested for use or reuse, which is represented by the search result and summary of the source code.

32. A computer implemented method as in claim 27, wherein the presenting the search result in a search result window associated with the source code editor further includes presenting the search result includes an application program interface (API) and information about where search results may be found and optionally what licensing restrictions the search result carries, and wherein the search results are ordered to first present the most useful search result solutions or most likely search result matches.

33. A computer implemented method as in claim 32, further including any licensing restrictions the search result carries.

34. A computer implemented method as in claim 27, wherein the constructing a search criterion further includes:
constructing a search query from the programming language and element name extracted;
using signature information of the defining element as a search parameter; and
specifying the breadth of desired results the developer would like to receive, wherein the specifying the breadth is selected from the set of breadth parameters consisting of exact matches, better matches, and more matches.

35. A computer implemented method as in claim 27, wherein the related defining or structural elements are part of the new code or changed code or are elements surrounding the new code.

36. A computer implemented method as in claim 35, wherein the elements surrounding the new code or changed code include a method declaration that is a defining element of the new code being written or the code being changed that implements a method of the code.

37. A computer implemented method as in claim 27, wherein the conducting a search based on the constructed search criterion further includes:
indexing source code prior to the conducting of the search so that the search is conducted more rapidly than without the indexing; and
the indexing including recording searches and search results selected by developers and indexing such search results in order to iteratively improve the ranking and display order of future search results.

38. A system comprising:
a processor to execute a set of instructions, the instructions including: running a background component to continuously monitor a source code editor running in the computer;
detecting a new source code entered within the source code editor using the background component;
capturing the new source code at a time the new source code is entered within the source code editor;
extracting the new code or code change and parsing the new code to extract related defining or structural elements of the source code;
automatically programmatically constructing a search criterion based on the new source code and its defining elements detected by parsing the new source code entered within the source code editor; wherein constructing the search criterion includes conducting the search on source code indexed prior to conducting the search so that the conducted search is conducted more rapidly than without the indexing, the source code indexing including recording prior searches and search results and indexing such prior searches and search results in order to improve the quality and display order ranking of future search results;
issuing a search request to a search engine including passing the automatically constructed search criterion as parameters to find source code that has the same or similar defining elements as the new source code or changed source code which the search criterion was constructed from;
conducting a search based on the constructed search criterion;
receiving a search result in response to a search conducted based on the search criterion;
presenting the search result within the source code editor; and
a memory coupled to the processor to store the set of instructions.

39. A system as in claim 38, wherein:
the presenting the search result in a search result window associated with the source code editor further includes presenting the search result includes an application program interface (API) and information about where search results may be found and what licensing restrictions the search result carries, and wherein the search results are ordered to first present the most useful search result solutions or most likely search result matches;

the constructing a search criterion further includes:

constructing a search query from the programming language and element name extracted;

using signature information of the defining element as a search parameter; and specifying the breadth of desired results the developer would like to receive, wherein the specifying the breadth is selected from the set of breadth parameters consisting of exact matches, better matches, and more matches;

wherein the related defining or structural elements are part of the new code or changed code or are elements surrounding the new code, and wherein the elements surrounding the new code or changed code include a method declaration that is a defining element of the new code being written or the code being changed that implements a method of the code;

the conducting a search based on the constructed search criterion further includes:

indexing source code prior to the conducting of the search so that the search is conducted more rapidly than without the indexing; and the indexing including recording searches and search results selected by developers and indexing such search results in order to iteratively improve the ranking and display order of future search results.

\* \* \* \* \*